United States Patent [19]
Barrow

[11] Patent Number: 5,189,326
[45] Date of Patent: Feb. 23, 1993

[54] INFORMATION STORAGE MEDIA HAVING INFORMATION STORED THEREON FOR PLAYBACK AT DIFFERENT SPEEDS AND METHOD OF INDEXING SUCH STORED INFORMATION

[76] Inventor: Gregory M. Barrow, 6370 Ashwood Dr., Salt Lake City, Utah 84124

[21] Appl. No.: 807,254

[22] Filed: Dec. 13, 1991

[51] Int. Cl.⁵ .............................................. G11B 15/12
[52] U.S. Cl. .................................... 360/63; 360/73.05
[58] Field of Search ............... 360/73.05, 73.06, 73.07, 360/63

[56] References Cited

U.S. PATENT DOCUMENTS

| | | | |
|---|---|---|---|
| 1,351,116 | 11/1914 | Cannon | 360/72.2 |
| 3,699,527 | 10/1917 | Duerden | 360/72.2 |
| 3,739,086 | 6/1973 | Heather | 360/72.2 |
| 4,048,659 | 9/1977 | Fink, Jr. et al. | 360/73.06 |
| 4,473,854 | 8/1984 | Oishi et al. | 360/72.2 |
| 4,525,755 | 6/1985 | Meek | 360/63 |

Primary Examiner—Vincent P. Canney
Attorney, Agent, or Firm—Mallinckrodt & Mallinckrodt

[57] ABSTRACT

Information storage media, such as cassette tapes or laser discs adapted to be read by machines, such as cassette tape players or compact disc players, has some information stored thereon adapted to be played back at a first speed and other information stored thereon adapted to be played back at a second speed. The storage or playback characteristic of the information on the media will generally vary with the speed at which the information is adapted to be read and the information is divided between the two speeds based on such characteristics. The media may advantageously be used to provide full text readings of magazines, newspapers, books, etc., and to provide indexing for such full text readings. The full text readings are broken into separate informational items, such as the individual magazine or newspaper articles or book chapters, which are stored on the media to be read back at a slow speed while individual summaries of the separate information items are stored to be read back at a faster speed. The informational items and their summaries are arranged on the media so that an informational item may be accessed at the completion of the summary of such item.

20 Claims, 1 Drawing Sheet

INFORMATION STORAGE MEDIA HAVING INFORMATION STORED THEREON FOR PLAYBACK AT DIFFERENT SPEEDS AND METHOD OF INDEXING SUCH STORED INFORMATION

BACKGROUND OF THE INVENTION

1. Field

The invention is in the field of information storage media, such as magnetic tape or compact laser discs upon which information is stored and may be read back from the media by means of a machine.

2. State of the Art

It is currently common practice to record information, such as sound information, on magnetic tape or discs of various types to be played back from the media through use of a machine, such as an audio tape player or a compact disc player. For example, it is common to supply music or spoken words on magnetic tape in a cassette device for playback by the purchaser of the tape cassette in an audio tape player. When the information is recorded onto the tape, it is placed thereon so that it can be played back or read intelligibly by the machine at a preset constant speed. If played back or read at a speed substantially different from the preset speed, the information becomes unintelligible or unpleasant. Thus, normal prerecorded music cassettes are recorded so that they should be played back at a standard tape speed of 4.8 centimeters per second. Most cassette playback equipment commercially available is designed to play back cassette tapes at this standard speed. In this way substantially all prerecorded cassette tapes and cassette tape playback equipment are compatible so that such tapes may be played back on any standard cassette playback machine.

The size of the standard cassette limits the amount of tape that can be held in the cassette. The amount of tape in the cassette, in turn, limits the amount of material that can be recorded on the tape. The speed at which the tape is designed to be played back determines the amount of information that can be stored on a given length of tape. Thus, the slower the speed at which the tape is designed to be played back, the greater the information that can be stored on the tape.

However, the currently known systems for reading information that is stored on magnetic tape are speed dependent. The speed at which a tape passes the head in a tape playback machine which reads the information stored on the tape has a significant effect on the frequency response obtainable for the played back information. The frequency response is important because it affects the fidelity of the played back information. The standard cassette speed was chosen to give staisfactory high frequency response for the played back signals with state of the art tape and magnetic playback heads while at the same time, going as slowly as possible to give maximum information storage on the tape. Any reduction in tape speed reduces the frequency response. Similarly, with compact discs, it is the number of bits of digital information provided for any given playback time unit that determines the frequency response.

While high frequency response giving high fidelity sound reproduction is generally considered a necessity for music reproduction, reproduction of the spoken word does not require such high fidelity so does not require such high frequency response. Over the past several years, cassette record and playback equipment has been developed which operates at speeds below the standard speed. For example, Norwood Industries, Inc., Salt Lake City, Utah, has developed and markets several cassette record and playback machines which operate at one-quarter normal speed. This reduction in speed allows four times as much information to be recorded on a given length of tape so that a cassette which can normally hold ninety minutes of information at standard speed, will contain six hours of information at one-quarter standard speed. These machines also operate as monaural machines so that information can be recorded on each of the normal four track of a cassette tape and played back separately rather than having the two separate stereo signals recorded on two of the tracks and played back simultaneously. This separate playback of each track of information doubles again the amount of playback time obtainable from a standard cassette so that twelve hours of monaural information can be obtained from a standard ninety minute cassette. This increase in recorded or stored information allows readings or dramatizations of entire novels or other books to be stored on a single cassette tape.

Prerecorded cassette or other tapes, or other media upon which such information may be stored, are supplied to be played at a single preset speed. Thus, most cassette tapes are recorded to be played back at normal speed, with a number of tapes now available to be played back at one-quarter speed. However, tapes are not supplied with some information recorded to be played back at one speed and other information to be played back at another speed.

SUMMARY OF THE INVENTION

According to the invention, it has been found advantageous in certain circumstances to provide some information stored on an information storage media adapted to be played back or read at one preselected speed and other information stored on the same information storage media adapted to be played back or read at a second preselected speed. This has been found most useful on multitrack media, such as audio cassette tapes or on random access media, such as laser discs (compact discs), where some of the tracks or memory storage areas will contain information to be read at one speed and the other tracks or memory storage areas will contain information to be read at a second speed. With this arrangement it is possible to index and preview material, such as magazines, anthologies, or reference books at the higher speed and to have full text of the previewed or indexed material at the lower speed. In such instances, the individual informational items, such as the individual magazine articles, book chapters, or referenced articles, are stored as individual information packets on the media to be read at the lower speed and summaries of each of the informational items are also stored as separate information packets on the media, but to be read at the higher speed.

The combination of higher speed and lower speed information is also useful where both high fidelity material and low fidelity material is to be stored on the same media where a lower speed may be used for storing the lower fidelity material but much more of that material may be stored in a given space than the higher fidelity material. This is also advantageous with both tracked storage media, such as audio cassette tapes, or with random access media, such as laser discs.

The information storage media of the invention thus includes the storage media, information stored on the media adapted to be read by a machine and intelligible when read at a first predetermined speed, and information stored on the media adapted to be read by a machine and intelligible when read at a second predetermined speed. In one specific embodiment of the invention, the media is multitracked media wherein one or more, but not all, of the tracks contain information to be read at the first speed and the other tracks contain information keyed to the information to be read at the first speed, such as by being positioned physically adjacent to such information on the media, but to be read at the second speed wherein information can be stored more densely on the media at the second speed so more information storage takes place at the second speed. With such embodiment, a magazine may be read onto the media to be played back wherein a short summary of each article in the magazine may be provided to be read by the machine from the media at the first, higher speed, and the complete text of the article summarized provided to be read by the machine from the media at the second, slower speed. Because of the difference in the storage density or capacity of a certain length of tape at the different speeds, the summary and the full text version of the same article can be arranged on the tape so that they each take up approximately the same amount of storage space, or, if two tracks of low speed storage are used for each track of high speed storage, take up to about the space of two summaries. Thus, a listener can play a cassette tape at the first speed on a track having information readable at the first, higher speed, and listen to summaries of the various articles in the magazine. When the listener hears a summary of an article that is of further interest to him, he can immediately switch to the second, slower speed, switch to the track containing the information readable at the slower speed, and listen to the full text of the article. At the end of the full text, he can then switch back to the first speed for summaries of additional articles, and, when desired, switch to the second speed to listen to the full text of another article of interest. In this way, the full text of an article is immediately available along with the summary. In addition, the summaries of the articles serve as an index for the collection of full text readings of the articles. It should be noted that the information stored on the media is of the same type and produces the same type output regardless of the speed at which it is readable. Thus, for an audio tape as described above, the information readable at the first speed represents audio sound and the information readable at the second speed also represents audio sound. Thus, upon playback at either speed, the user hears normal audio sound.

In a second embodiment of the invention, the media is arranged so that information stored on the media which requires high fidelity (high frequency response) is adapted to be read from the media at a first speed and information stored which does not require high fidelity is adapted to be read from the media at a second speed. For example, music may be provided on the media to be played back at the higher speed which results in better fidelity, and the spoken word may be provided on the media to be played back at the lower speed where the higher fidelity is not required. Again, the information read at each speed produces the same type of output, e.g., sound signals that are heard in normal fashion by the user.

This invention also includes a method of storing and indexing related information on media so that a portion of the information is adapted to be read from the media at one speed and the rest of the information is adapted to be read from the media at a sound, slower speed wherein the related information is located physically on the media so that one portion of the related information can be read from the media immediately after the other portion.

THE DRAWINGS

The best mode presently contemplated for carrying out the invention is shown in the accompanying drawings in which:

FIG. 1 is a diagramatic representation of a portion of a standard audio cassette magnetic tape showing how the tape is normally divided into sides and tracks; and FIG. 2, a diagramatic representation of a portion of a tape similar to that of FIG. 1, showing the arrangement of information thereon according to the invention.

DETAILED DESCRIPTION OF THE ILLUSTRATED EMBODIMENT

Figure 1:
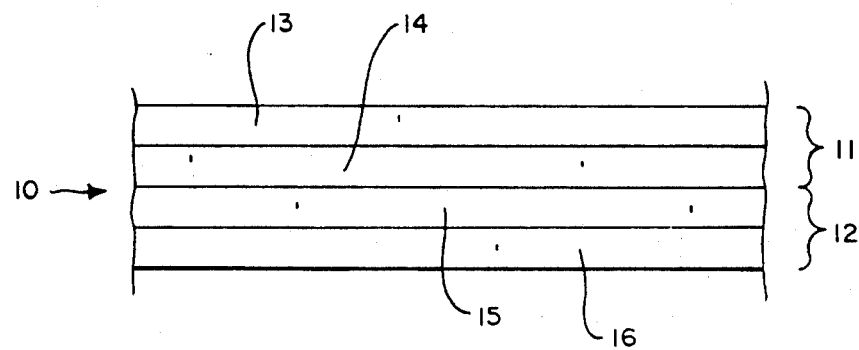

The information on the tape of a standard, prerecorded, audio tape cassette is usually configured so that the tape 10, FIG. 1, has two sides, 11 and 12, with two tracks 13 and 14, and 15 and 16, respectively, on each side. If the tape has stereo information thereon, each track of each side contains separate information representing each separate channel of the stero. Thus, for side 11, track 13 would contain information for one stero channel, such as the left channel, while track 14 would contain information for the other channel, such as the right channel. During playback of the tape in a stereo playback machine, tracks 13 and 14 are read separately but simultaneously and the signals read therefrom are separately amplified and sent to the separate stereo speakers for conversion into audible sound. The standard playback equipment is designed to read and playback either tracks 13 and 14 simultaneously, which together make up what is referred to as one side of the tape, or to read and playback tracks 15 and 16 simultaneously, which together make up what is referred to as the other side of the tape. If the tape contains monaural rather than stereo information, either tracks 13 and 14 comprising side 11 and tracks 15 and 16 comprising side 12 of the tape will contain the same information, or the two tracks on each side of the tape will be combined to form a single monaural track.

With special one-quarter speed, one-quarter track tape format for use with one-quarter speed, one-quarter track record and playback equipment, such as manufactured and sold by Norwood Industries, Inc. of Salt Lake City, Utah, each track 13, 14, 15, or 16 of the tape 10 is recorded with separate monaural information which can be read or played back separately. Further, with such tape format, the tape speed is reduced to one-quarter standard tape speed. Thus, much more information can be put onto the tape using such format than can be put onto the tape using the standard format at standard speed. With the quarter-track format at quarter-speed, an entire novel may be stored on a single tape cassette. Also, if desired, an entire issue of a magazine, such as Time Magazine, could be read onto and stored on a cassette tape. This would be beneficial for people, such as truck drivers, who have a lot of listening time, but not much reading time, or people who are blind and cannot read or those who are illiterate and cannot read.

If the magazine could be obtained on cassette tape where the articles are read orally, one could listen to the magazine rather than read it.

A problem with a magazine on tape, however, is that all people usually aren't interested in all articles so don't read completely all articles. Thus, these people would not want to listen to the full text of each article on the tape. Therefore, the person listening would have to listen to enough of an article to determine if he is interested in the article, then fast forward through the article to the next one if he was not interested. With the current invention, each article of the magazine is summarized so that a person can listen to the summary of an article, and, after the summary, if interested, can listen to the full text of the article. If not interested after listening to the summary, the summary of the next article immediately comes on. The person merely listens to summaries of the articles until he comes to one he wishes to listen to the full text of. At that point, he merely switches the side, speed, and track on the tape and tape player and listens to the full text.

This is accomplished by adapting the tape so it contains the article summaries on one side of the tape adapted to be played back at a first speed, such as standard speed, and the full text of the articles on a track of the other side of the tape and adapted to be played back at a second, reduced speed, such as one-quarter normal speed. The one-quarter track, one-quarter speed cassette machines manufactured and sold by Norwood Industries, Inc. are designed to play tapes at either standard speed so that standard cassette tapes can be played on the machine, or to play the tapes at the reduced one-quarter speed. When playing tapes at standard speed, both tracks on the side being played are played simultaneously. When playing tapes at one-quarter speed, each track is played back separately and a track selection switch is provided so that each track of a side can be separately selected.

Figure 2:
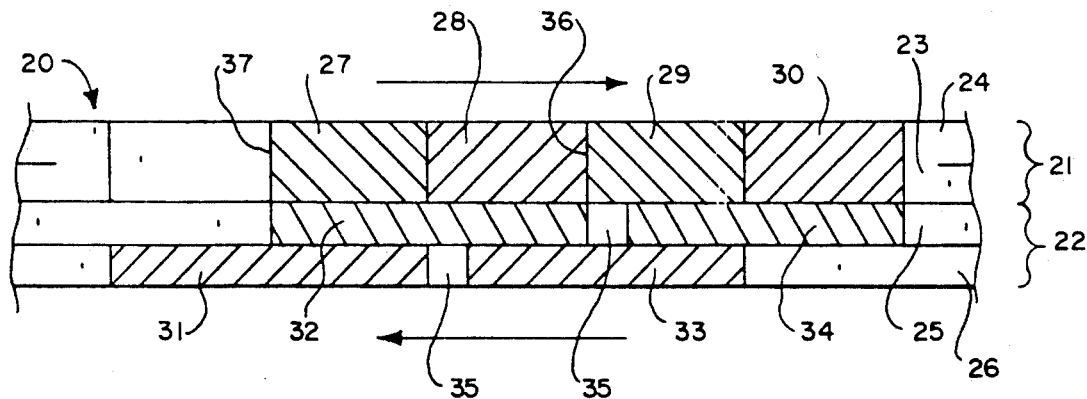

In the embodiment of the invention shown in FIG. 2, one side 21 of the tape 20, is recorded so that it is to be played back at standard speed. The second side 22 of tape 20 is recorded so that it is to be played back at one-quarter speed. The two tracks, 23 and 24, on the standard speed side 21, are shown as combined and recorded as a single track, but could be recorded separately for stereo or for separate playback if desired and compatible with the playback quipment. The two tracks 25 and 26 of the second side 22, are recorded separately to be played back separately.

Summaries of the articles are recorded on the standard speed side 21 of the tape, and summaries of four articles are shown schematically as separate information packets or spaces 27, 28, 29, and 30 os side 21 of the tape. Thus, the length of tape indicated by 27 on side 21 forms an information packet and contains information thereon representing a summary of one article. Similarly, the length of tape indicated by 28 contains a summary of another article, the length of tape indicated by 29 contains a summary of a third article, and the length of tape indicated by 30 contains a summary of a fourth article. Additional information packets representing summaries would preceed and follow those specifically shown.

The information representing the full text of the articles are placed on one or the other of the tracks on side 22 of the tape, each article forming a separate information packet or filling a separate space on the tape. Thus, as shown, the information representing the oral reading of the full text of the article summarized at 27, is placed on track 26 of side 22 as information packet 31. As shown for this particular embodiment, side 22 is played back in the opposite direction as is side 21, the direction of playback for each side being indicated by the arrows adjacent the sides. The full text of the article summarized at 27, represented by information packet 31, is arranged so that it starts at the same longitudinal position on the tape that the summary 27 ends. The full text, represented by information packet 32, of the article summarized at 28 is placed on track 25 as shown, the full text, represented by information packet 33, of the article summarized at 29 is placed on track 26 as shown, and the full text, represented by information packet 34, of the article summarized at 30 is placed on track 25 as shown. With two slow speed tracks available for the one standard speed track, the space available for each full text article is equal to the space used on the tape for two summaries and, since tracks 25 and 26 are played back at one-quarter the speed at which side 21 containing the summaries is played back, each full text article has available four times the amount of time used for the two summaries. Thus, if each summary is prepared to take one minute of playback time, the time available for each full text article will be eight minutes. If the full text reading does not take the full eight minutes, or other time alloted, other material, such as advertising material, may be placed on the unused space, such as shown at 35. Usually it will be desirable when placing material, such as a magazine, on tape, that space be provided for advertising, not only between full text information, but also intersperced between summaries as well. If space for advertising is provided between every second summary, the time available for each full text article is increased by four times the amount of time allowed for such advertising.

With the format as shown in FIG. 2, a person will start listening to the magazine by listening to the summaries on side 21 at standard speed. When he hears a summary that particularly interests him so he desires to listen to the full text of the article summarized, at the end of the summary, he immediately turns over the tape cassette (or in a bi-directional player, such as auto-reverse players, changes the direction of tape travel), changes the speed to one-quarter speed, sets the proper track which will usually be indicated at the end of the summary, and listens to the full text of the article. When finished listening to the full text, he again changes the side of the tape and speed of the machine and either listens to the summaries again and then moves on to new summaries, or fast-forwards through the summaries already heard to new summaries. Thus, for example, if while listening to the summary 28 on side 21 of tape 20, the listener decides that he would like to listen to the full text of the article summarized, at the end of the summary 28 as indicated by line 36, which is also the start of summary 29 and the start of the full text 32 of the article summarized at 28, the user turns over the tape (or changes direction of travel of the tape), changes the speed of the machine (this could be automatic with direction change), and selects track 25. The tape starts moving in the opposite direction and plays back the full text 32. At the end of the full text, indicated at line 37, the listener again turns over the tape, changes the speed to normal speed, and begins listening to the tape. At this point summary 27 will begin so the listener can again listen to summaries 27 and 28 before getting to new summary 29, or can fast forward through summaries 27 and 28 to get to new summary 29. As far as the listener is concerned, the reading of the summary and the reading of the full article sound the same coming from the player as far as sound and speed of speech is concerned. The difference in speed makes no difference as far as the listener can descern, it merely provides an easy way to format and operate the tape and player to provide both summaries and full text readings in an easily accessable manner.

While the summaries have been shown in FIG. 2 for convenience of explanation as all equal in length, the summaries do not all have to be the same length and will usually vary in length depending upon the article being summarized and the full text reading of each article will also vary in length. Thus, the readings of the summaries, full text articles, any advertising to be placed on the tape, and any other material to be placed on either side of the tape will normally be prepared and timed. The order and placement of the articles, advertising, and other material on the tape is then determined so that the full text of each article will be positioned to begin at the end of its summary, as described, and to fit into the available space.

The relative position on the tape of the information representing the summaries and the information representing the full text of the articles summarized (the summary of an article being related to the full text of the article summarized) key the two together so that the full text is easily accessable at the end of the summary.

While the invention has been described in detail in connection with its application to the placing of a magazine on tape wherein both summaries of the articles and full text of the articles are included and positioned so that the full text can be played immediately upon listening to the summary, the invention can be applied to various other uses. For example, reference books, such as the Bible, could be summarized on one side of the tape with the full text contained on the other side. The summaries and full text portions would be positioned on the tape similarly as described for the magazine so the portion of the full text summarized with each summary is available for playback at the end of its summary. Anthrologies, such as collections of short stories, or newspapers, could be placed on tape and indexed with summaries in a similar manner. Further, presentations wherein both the spoken word and interludes of music are presented can be arranged so that the spoken word, which does not require the same high-fidelity as the music, can be provided on one side of the tape to be played back at slow speed while the music is played back at standard speed to provide the desired fidelity.

Further, while magnetic tape in an audio tape cassette has been used as the example of the storage media, any storage media may be used which can be read at preselected speeds and which has different storage or playback characteristics, such as different storage densities, at the different speeds. When referring to a media being read at different speeds, it is not necessary in all cases that the actual speed at which the media pass through the machine change, if, in fact, the media actually moves through the machine at all. Thus, while with magnetic tape having audio signals thereon the actual speed at which the tape passes the playback head will generally change, with media having digital information thereon, a change in the number of bits of information read by the playback machine in a given time period is a change of speed at which the media is read by the machine.

An important advantage of using a standard speed as one of the speeds at which the information can be read is that most people will have a standard playback machine available to play back the media at that standard speed. Thus, with standard audio cassettes, most people have access to a standard speed cassette playback machines. Also, with compact discs, a large number of people have standard speed playback machines available. Currently, relatively few people have a slow speed cassette playback machine and slow speed compact disc players are still in the development stage. If the media uses a standard speed as the first speed, any person with a standard playback machine can play the first speed portion of the media to at least overview the index portion of the media containing the summaries of the articles. Thus, although a person cannot hear the full text of, for example, the magazine on the tape, he can listen to the full summary of the magazine and if sufficiently interested, can obtain either the required second speed playback machine to listen to the full text, or obtain the magazine itself to read the full text of the desired articles. Because of this, one of the speed dependent playback characteristics that can be used for selection of information to be stored at the first speed and the second speed is the wide availability of playback equipment for playback at one of the speeds.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Information storage media adapted to be read by a machine at predetermined speeds and having information representative of audio sound stored thereon, and wherein the characteristics of the information as read back from the media by the machine depend upon the speed at which the media is read, comprising multitrack information storage media adapted to be read by a machine; information representative of audio sound stored thereon adapted to be read by a machine and intelligible to a listener as audio sound when read by the machine at a first speed; information representative of audio sound stored thereon adapted to be read by a machine and intelligible to a listener as audio sound when read by the machine at a second speed; wherein at least one characteristic of the information as read back from the media by the machine depends upon the speed at which the media is read and the information stored on the media is divided between that adapted to be read at the first speed and that adapted to be read at the second speed based upon the characteristics of the information; wherein at least some of the information adapted to be read at the first speed is related to at least some of the information adapted to be read at the second speed; and wherein related portions of the information are stored on different tracks of the media and are keyed to one another.

2. Information storage media having information stored thereon according to claim 1, wherein the information adapted to be read at a first speed is stored on selected tracks of the media and the information adapted to be read at a second speed is stored on other selected tracks of the media.

3. Information storage media having information stored thereon according to claim 1, wherein the related portions of the information are keyed to one another through their physical location on the media.

4. Information storage media having information stored thereon according to claim 1, wherein a characteristic of the information that depends upon speed is the amount of information stored in a given amount of media, more information being stored on a given amount of media and read back from a given amount of media at the second speed than at the first speed, and wherein the information stored is made up of a plurality of information packets of varying length, the relatively longer of the packets being stored on the media at the second speed and the relatively shorter of the packets being stored on the media at the first speed.

5. Information storage media having information stored thereon according to claim 4, wherein the information packets include informational items and summaries of the informational items, the informational items being among the relatively longer of the information packets and the summaries of the informational items being among the relatively shorter of the information packets.

6. Information storage media having information stored thereon according to claim 5, wherein the information packets stored on the media are signals representative of audio sound.

7. Information storage media having information stored thereon according to claim 1, wherein a characteristic of the information that depends upon speed is the frequency response obtainable from the information, greater frequency response being obtainable from the information stored to be read at the first speed than from the information stored to be read at the second speed and wherein the information stored is made up of information for which relatively greater frequency response is desired, such information being stored on the media to be read at the first speed and information for which the relatively greater frequency response is not required, such information being stored on the media to be read at the second speed.

8. Information storage media having information stored thereon according to claim 7, wherein the information for which relatively greater frequency response is desired include signals representing music and the signals for which the relatively greater frequency response is not required include signals representing the spoken word.

9. Information storage media having information stored thereon according to claim 1, wherein a characteristic of the information that depends upon speed is that the information readable at one of the first or second speeds is readable by a large number of existing machines while the information readable at the other of the first or second speeds is readable by a lesser number of special machines.

10. Multi-track information storage media adapted to store information representative of audio sound and to be read by a machine at predetermined speeds and wherein the amount of information stored on the media is dependent upon the speed at which the media is to be read, comprising multi-track information storage media adapted to be read by a machine; information representative of audio sound stored thereon adapted to be read by a machine and intelligible to a listener as audio sound when read by the machine at a first speed; information representative of audio sound stored thereon adapted to be read by a machine and intelligible to a listener as audio sound when read by the machine at a second speed; wherein more information can be stored on the media at the second speed than at the first speed; and wherein the information stored includes a plurality of informational items and a plurality of summaries of the informational item, each summary of an informational item being related to an informational item, the informational items being stored to be read at the second speed and the summaries being stored to be read at the first speed, a summary of an informational item being stored on a different track of the multi-track information storage means that its related information item and being keyed thereto.

11. Information storage media according to claim 10, wherein the information to be read at the first speed and the information to be read at the second speed is arranged so that an informational item can be read from the media by the machine at the second speed immediately upon conclusion of the reading of the summary of the related informational item from the media at the first speed.

12. Information storage media according to claim 11, wherein the informational items represent oral readings of informational items and the summaries of the informational items represent oral summaries of the informational items.

13. Information storage media according to claim 12, wherein the informational items are articles contained in a magazine.

14. Information storage media according to claim 13, wherein the information storage media is magnetic tape.

15. Information storage media according to claim 14, wherein the magnetic tape is divided into at least two parallel tracks extending the length of the tape, at least one track of the at least two tracks thereof containing the information adapted to be read at the first speed and at least one track of the at least two tracks thereof containing the information adapted to be read at the second speed.

16. Information storage media according to claim 15, wherein the magnetic tape is divided into two parallel sides, wherein one side contains the information adapted to be read at the first speed, wherein the other side is divided into two parallel tracks, each of which track contains information adapted to be read at the second speed and adapted to be read separately by a machine operating to read the tape at the second speed, and wherein the start of an informational item on one or the other of the two parallel tracks is physically located so as to be aligned with the end of the summary of such item on the first side of the tape, whereby an informational item can be read from the tape upon configuring the machine to read a selected track of the tape at the second speed immediately upon completion of the reading by the machine of the summary of the informational item from the tape at the first speed.

17. A pre-recorded, audio cassette tape comprising a cassette housing; a supply of tape mounted within said cassette housing for movement by a cassette playback machine in which the cassette may be inserted across a playback head of the playback machine, sand tape having a first side and a second side, said second side being divided into two parallel tracks adapted to be read separately by the playback machine; first speed audio information packets stored on the first side of said tape and adapted to be played back at a first speed; second speed audio information packets stored on the second side of said tape and adapted to be played back at a second speed, said second speed being slower than said first speed and allowing more information to be stored at said second speed for a particular length of tape than can be stored at said first speed; at least some of the first speed information packets and some of the second speed information packets being related and the related first speed packets and the second speed packets being physically arranged along the length of the tape so that the first speed packet ends at the location that its related second speed packet begins.

18. A pre-recorded, audio cassette tape according to claim 17, wherein at least some of the second speed packets represent the oral reading of separate magazine articles and each related first speed packet represents the oral reading of a summary of the magazine article of the second speed packet to which it relates.

19. A method of indexing items of audio material stored on information storage media comprising the steps of preparing audio summaries of the items of material to be indexed, said summaries serving as the index information for the items of material; dividing the media into a portion to be read at a first speed and a portion to be read at a second speed, said second speed being slower than said first speed and allowing more information to be stored in a given area of media than at the first speed; dividing the portion of the media to be read at the first speed into a plurality of spaces, each of said spaces adapted to store a separate audio summary; dividing the portion of the media to be read at the second speed into a plurality of spaces, each of said spaces adapted to store a separate item of audio material; arranging each of said spaces adapted for storage of an item of material and each of said spaces adapted for storage of a summary so that the item of material may be read from the media upon completion of the reading of the summary of such item of material from the media.

20. A method according to claim 19, wherein the step of arranging each of the spaces adapted for storage of an item of material and each of the spaces adapted for storage of a summary so that the item of material may be read from the media upon completion of the reading of the summary of such item of material from the media includes the step of physically aligning the end of the space for storage of the summary with the start of the space for storage of the item of material.

* * * * *